United States Patent [19]

Freedman et al.

[11] 3,769,618

[45] Oct. 30, 1973

[54] THIN FILM LOW TEMPERATURE CONDUCTORS AND TRANSMISSION LINES

[75] Inventors: James F. Freedman, Pleasantville, N.Y.; George R. Henry, Palo Alto, Calif.; Ashok F. Mayadas, Somers; Morris Shatzkes, Monsey, both of N.Y.

[73] Assignee: International Business Machines Corporation, Armonk, N.Y.

[22] Filed: Dec. 27, 1971

[21] Appl. No.: 212,238

[52] U.S. Cl. .................... 333/84 M, 333/95, 333/96

[51] Int. Cl. ........ H01p 3/06, H01p 3/08, H01p 3/12

[58] Field of Search ................. 333/84 R, 84 M, 96, 333/99 S, 95

[56] References Cited

UNITED STATES PATENTS 2,894,226 7/1959 Wild et al. ............................ 333/96

*Primary Examiner*—Paul L. Gensler

*Attorney*—Graham S. Jones, II et al.

[57] ABSTRACT

A conductor or transmission line composed of at least one thin conductive member for operation in the anomalous skin effect region, i.e., low temperature and high frequency in which the thickness of conductors is selected for minimum impedance and resistance to current within the thickness range wherein the resistance and impedance are below the thick film resistance and impedance in the anomalous skin effect region. Thickness optimization yields these results independently of dielectric materials or actual placement of conductors with respect to each other in a transmission system.

10 Claims, 16 Drawing Figures

THIN FILM LOW TEMPERATURE CONDUCTORS AND TRANSMISSION LINES

BACKGROUND OF THE INVENTION

1. Field of the Invention

This invention relates to electrical transmission and interconnection systems and more particularly to thin film transmission and interconnection systems.

2. Description of the Prior Art

It is very well known that the classical skin effect exists at room temperature, operating to increase the impedance and resistance of conductors and transmission lines. Designs of circuits has required that effect to be taken into account as by providing hollow conductors.

It is also well known that it is desirable to refrigerate a circuit or a power distribution system in order to minimize resistive losses. A simple analysis based upon the classical skin effect indicates that if the D. C. resistivity of a metal decreases by a factor of 10,000 in going from room temperature to low temperature, then the high frequency resistance should decline by a factor of 100. In "The Role of Low Temperatures in the Operation of Logic Circuitry" by Keyes et al., Proceedings of the IEEE, December 1970, p. 1914 et seq. it is taught that "The maximum improvement in resistance that can be obtained by cooling in this case is about a factor of six (see FIG. 4), and most of the improvement is obtained by cooling to about 77°K." This type of performance is explained by a phenomenon known as the "Anomalous Skin Effect" described in Matick, "Transmission Lines for Digital and Communication Networks," p. 93–152. This effect reduces the advantages obtained by cooling to temperatures in the liquid nitrogen range short of superconductivity to a large degree. Because of the small improvement of a factor of about 6, based upon the statement of facts, refrigeration of transmission lines is less attractive then it would have appeared to be at first.

SUMMARY OF THE INVENTION

In accordance with this invention a conductor is provided for transmission of electrical energy within a predetermined range of frequencies. Such transmission is characterized by an anomalous skin effect region in which the classical skin depth $\delta o$ of said conductor is smaller than the intrinsic mean free path of said conductor. A selected maximum temperature and corresponding minimum frequency are applied to the conductor.

The conductor has a thickness $t$ such that its impedance is less than the thick film impedance within the predetermined range of frequencies.

Further, in accordance with this invention, a method of transmitting electrical energy includes selecting a conductor with a thickness $t$ for operation at frequency $f$. Heat transfer is effected in the conductor to bring the conductor to a temperature T. Temperature T and frequency $f$ are such as to place the energy transfer in an anomalous skin effect region wherein the classical skin depth $\delta o$ of the conductor is smaller than the mean free path of the conductor as a function of thickness, i.e., the conductor is a thin film conductor at temperature T. Then electrical energy having a frequency component $f$ is applied to the thin film conductor of thickness $t$. As a result, the impedance of the conductor is substantially smaller than the impedance of a thick film conductor.

In another aspect of the method of this invention, electromagnetic energy is transmitted with a structure containing a conductor within a predetermined range of frequencies. Heat transfer is effected in the conductor to place the conductor at a temperature within the anomalous skin effect region for that predetermined range of frequencies.

The conductor is selected to have a thickness $t$ whereby the impedance of the conductor is smaller than for a thick film within that range of frequencies.

In still another aspect of this invention, apparatus is provided including a source of electromagnetic energy, and a conductor for transmitting the electromagnetic energy connection to the source.

The conductor has a thickness $t$, such that within a predetermined range of frequencies at a corresponding temperature for operation in the anomalous skin effect region, the thickness $t$ has a value providing a smaller impedance than a thick film conductor.

Still further, in accordance with this invention, a conductor or transmission line for carrying high frequency electromagnetic signals is provided and operated. The thickness of the conductor is substantially $t$, where $t$ defines a film thickness which provides a lower high frequency impedance than the impedance provided at a greater thickness at a temperature and frequency in the anomalous skin effect region where $R_{HF}$ is no longer proportional to the square root of the D. C. resistivity of the material.

In another aspect of this invention, the resistive component of the impedance may be minimal.

Further, in accordance with this invention $t$ is within a range of thickness values which minimizes the flow of current in the reverse direction.

Still further in accordance with this invention, $t$ is substantially $2[(9/4\pi)\delta o^2 l]^{1/3}$ where $\delta o$ is classical skin depth and $l$ is the electron mean free path.

An object of this invention is to reduce the impedance of a conductor substantially to a minimum value in the anomalous skin effect region. This invention is therefore applicable at high frequencies and low temperatures. Another object of this invention is to reduce the resistance of a conductor substantially to a minimum value within the anomalous skin effect region.

DESCRIPTION OF THE PREFERRED EMBODIMENT

INTRODUCTION

Figure 1A:
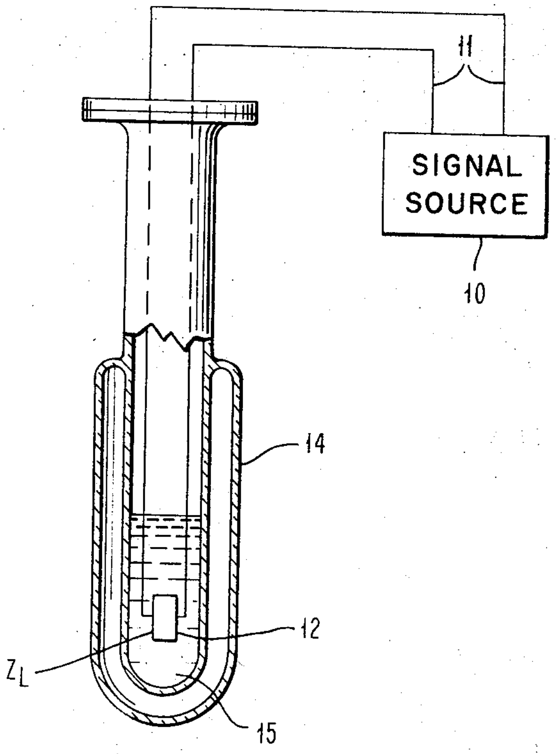
FIG. 1*a* shows a conductor maintained at a cryogenic temperature, and connected to a source of energy for transmitting power to a load $Z_L$.

Transmission lines are extensively used in many industrial applications as a means of transporting electric signals and hence electromagnetic energy. The distinction between a transmission line and a conductor to which ordinary A. C. analysis can be applied is not precise. Generally a conductor is considered a transmission line if there is a significant difference in phase between the input and output signals. The phase difference occurs because of the finite velocity of light, which is the velocity at which an electromagnetic wave propagates (i.e., $3 \times 10^{10}$ cm/sec). Thus a useful definition of a transmission line is as a conductor whose length is comparable to or greater than the wavelength ($\lambda$) of the signal being carried. The power company which wishes to transmit energy at $60H_z$ ($\lambda = 5 \times 10^6$ meters or $\approx$ 3,100 miles) regards its conductors, stretched over hundreds of miles, as transmission lines. Alternatively, in microwave (radar) circuits wavelengths of a few millimeters may be involved. In computer circuitry, fast-rise time pulses must be transmitted. The pulses are a superposition of high frequencies. Present and anticipated average frequencies involved are in the $10^8 - 10^{10}H_z$ range. This invention is concerned with such high frequency, continuous wave and pulse circuits.

A few transmission lines for carrying high frequency signals are shown in FIGS. 2A–2D and 2G. These configurations all consist of two or more conductors separated by free space. Generally the region between the conductors is to be filled with a solid dielectric in practice. All transmission lines are lossy. Some electromagnetic energy being transported is dissipated due to losses in the dielectric, losses in the conductor, and radiation losses to the outside world.

The losses in the conductor are dependent on the surface impedance of the conductor which can be defined quite independently of the particular type of transmission line under consideration. For transmission lines which involve sheet-type planar conductors (e.g., FIGS. 2A, 2B, and 2C), we define the surface impedance as the electric field at the conductor surface divided by the total net current flowing in the conductor.

In all cases it is desirable to reduce the surface impedance to its smallest possible value.

Here we show that if a transmission line is operated at low temperature and high frequency such that anomalous skin effect conditions are satisfied, based upon objectives chosen a proper choice can be made of conductor thickness for every given signal frequency and conductor type which will minimize the total surface impedance, the surface resistance and the surface, all in proper balance.

The classical skin effect (CSE) is well-known in connection with high frequency electrical circuits and is taken into account in designing interconnections, transmission lines, etc. in digital circuits and in the design of transmission lines for distribution of public electric power. The anomalous skin effect has not been analyzed so much as the CSE nor have transmission systems been designed for optimum performance in the anamolous skin effect (ASE) region, i.e., low temperature, high frequency and long mean free path.

This invention employs a relationship between frequency of the wave being carried by the conductor and the electron mean free path to optimize conductor thickness. Once a thickness has been established in accordance with this invention, conductors of optimum thickness can be used in a variety of transmission line/-ground plane design, for coaxial conductors, waveguides, and the like.

This invention applies to non-superconducting conductors in the anomalous skin effect region.

The anomalous skin effect (ASE) region is defined as that domain for which $$\delta o/l < 1 \quad (1)$$

where $\delta o$ is the classical skin depth or penetration depth of a high frequency electric field, i.e., $$\delta o = c/\ \sqrt{2\pi\omega/\rho} \text{ in Gaussian units} \quad (2)$$

here $c$ = velocity of light $\omega = 2\pi f$ and $f$ = frequency of electric field applied $\rho$ = intrinsic D. C. electrical resistivity (the resistivity the film would have if that film were infinitely thick) of a sample In equation (1), above, $l$ = the intrinsic electron means free path, (i.e. the mean free path an electron in a film would have if that film were infinitely thick). Note that $\rho$ and $l$ are related. For every metal the product $\rho \cdot l$ is a constant which can be measured. (See Matick, ibid)

Consider a series of sheet samples of some metal identical in every respect except for varying in thickness. Say the thinnest sample is very thin $\approx$ 100 A while the thickest is very thick $\approx$ 10 cm. The samples are assumed to be of high purity.

Figure 3:
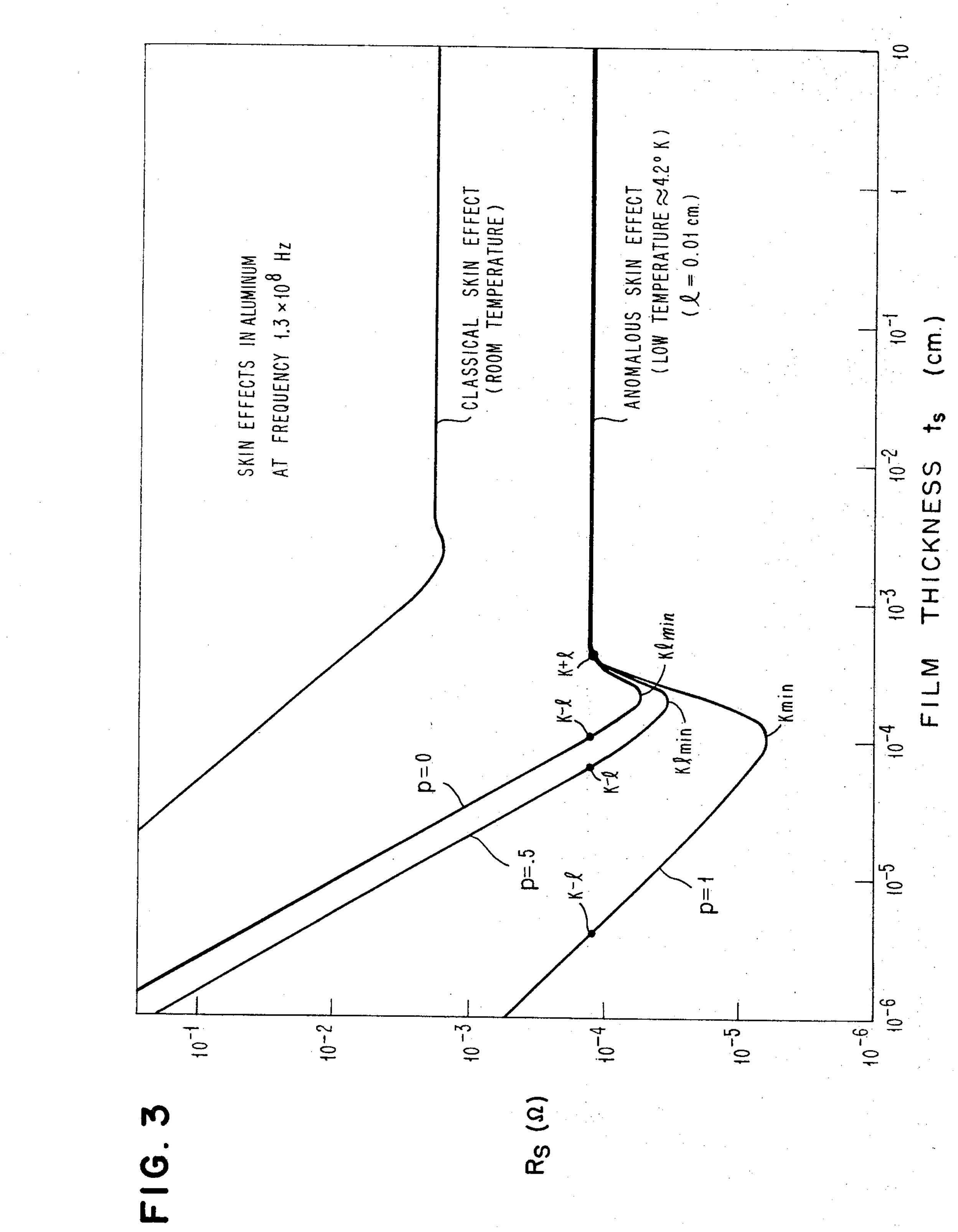
FIG. 3 shows a plot of resistance of an aluminum film conductor versus thickness under anomalous skin effect conditions.

Application of a high frequency electric field to each of these samples and measurement of the high frequency resistance R with a frequency in the Mc to low microwave range, i.e., $f$ varies from $10^6$Hz to $10^{11}$Hz, yields a curve of resistance versus thickness for any given frequency and temperature. For room temperature (296K) a resistance vs. thickness curve is shown in FIG. 3 labelled as the classical skin effect curve for aluminum. As the samples are cooled we have discovered that the curve in the anomalous skin effect region for a low temperature will be as shown lower in FIG. 3 for smoothess values $p$ of 0, one-half and 1. The term $p$ is defined as the fraction of electrons specularly reflected at the surface of the conductor. Microscopically smooth conductors therefore have a value of $p = 1$ and rough conductors have a value of $p = 0$. Least resistance occurs for the smoothest conductors surfaces, $p = 1$.

We have found that the minimum in the resistance vs. thickness curve starts becoming evident as we go into the anomalous skin effect. It continues to grow more pronounced as the conductor cools down. On the other hand the measured R for the thicker samples reduces much less and after some temperature, it stops changing altogether in accordance with the well-known Reuter-Sondheimer theory and Pippard and Chambers measurements.

The extreme left hand side shows an R vs. $t$ dependence which comes from the well-known Fuchs size effect. This is a D. C. effect and the reason it appears even upon application of a high frequency field is that the A. C. nature of the field is no longer significant below some thickness, i.e., the field is practically homogeneous in the sample. The A. C. nature of the field will certainly be insignificant for thicknesses $t$ such that $t << \delta o$ The transition region between the thick film anomalous skin effect and the effect in thin films shows a relatively deep minimum which is a peculiarity of the thin film anomalous skin effect. A similar effect does exist under classical skin effect conditions (i.e. at room temperature) but it is small and of little significance.

EQUATIONS

Surface impedance of metal films

A. Theory of skin effect in metals

Consider a metal film with surfaces parallel to the $xy$ plane of thickness $t$ and let $z = \pm t/2$ define the surfaces; $z = 0$ as at the center of the film. The fields $E(z)\, e^{i\,\omega +}$ and $H(z)\, e^{i\,\omega +}$ are in the $x,y$ plane and are related by Maxwell's equations $-H'(z) = 4\pi/c\ J(z)$ , $(E)'(z) = -\ i\omega/c\ H(z)$ $E(z)$ — electric field $H(z)$ — magnetic field $J(z)$ — current density $c$ — speed of light (Displacement current has been neglected.)

The magnetic field $H(z)$, can be eliminated to obtain $$E''(z) = 4\pi i\omega/c^2\ J(z) \ . \qquad (1)$$

Thus we required a relation between $J(z)$ and $E(z)$ to proceed further. We distinquish two cases:

i. Low frequency, thick film (or smooth surface conductor) region.

This is the case of the classical skin effect (CSE). In this case $$J(z) = 1/\rho E(z) \text{ , Ohm's law.} \qquad (2)$$

The frequency is limited by the requirement that the classical skin depth, $\delta o$, be greater than the electron mean free path, $l$, that is $$\delta_o = c\ \sqrt{\rho/2\pi\omega 0} > l \text{ (CSE)} \qquad (3)$$

ii. High frequency, anomalous skin effect (ASE) and size effect regions.

These regions cover the cases where Ohm's law equation 2 does not hold. In the ASE $l > \delta_o$ and the situation is that though electrons are accelerated (essentially) only within a skin depth of the surface, the effect of the field is manifested to distances within an order of a mean free path from the surface. That is, the excess velocity attained by an electron by the action of the field within a skin depth is carried by the electrons to greater depths into the metal. Thus a local relation, $J(z) = 1/\rho\ E(z)$, cannot describe the behavior in the ASE region. In the skin effect region the field is constant, not a function of $z$, but due to the scattering of electrons at the surface J is a function of $z$ and again $J(z) = 1/\rho\ E(z)$ is violated.

A relationship between the current density and the field can be obtained by solving the Boltzmann's equation for the electron distribution function. For a solution for very thick films see E. H. Sondheimer, Adv. in Phys. Vol. 1 (1952) section 4.3 (p. 30) which is a mathematical solution for a semi-infinite metal.

For a thin film, the combined solution of Maxwell's euations and the Boltzmann equations for a thin film can be obtained only numerically. Thus we must solve the following equations.

$$L_1(s) = E_1(|s/l|) - E_3(|s/l|)$$

$$L_2(s) = 2\int_1^\infty \frac{dm e^{-tm/l}}{1 - p e^{-tm/l}} \left(\frac{1}{m} - \frac{1}{m^3}\right) \cosh \frac{sm}{l}$$

$$E_n(s) = \int_1^\infty \frac{e^{-sm}}{m^n} dm \qquad (4)$$

$m$-dummy variable which drops out of equation below.

Combining this with equation (1) the field is found from $$E''(z) = \frac{3i}{2\delta_0^2 l} \int_{-t/2}^{t/2} dZ'[L_1(z-z') + pL_2(z-z')]E(z') \qquad (5)$$

and the appropriate boundary conditions.

B. THE IMPEDANCE

For a film there is ambiguity in the definition of the impedance. The surface impedance is normally defined as the field at the surface divided by the total current. For a film there are two surfaces; thus the ambiguity. We will define the impedance as the field on the surface at $z = -t/2$ divided by the total current and express this in dimensionless form by multiplying by $l/\rho o$. Thus we use $$Z = \frac{lE(-t/2)}{\rho_0 \int_{-t/2}^{t/2} J(z)\, dz} \qquad (6)$$

where $E(-t/2)$ is the field at the surface where $z = -t/2$.

Figure 1B:
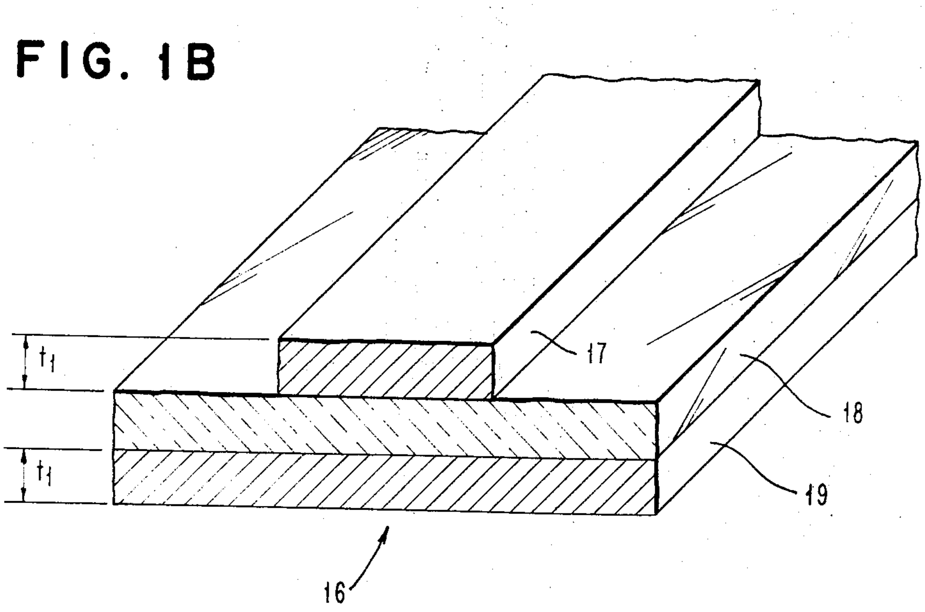
FIG. 1*b* shows a cross section of a conductor suitable for such energy transfer at high electrical frequencies.

Referring to FIG. 1A an alternating current or pulse signal source 10 is shown connected through lines 11 to a circuit package 12 housed in a thermal flask 14 in a cryogenic fluid such as helium or nitrogen 15 depending upon the desired temperature. A parallel conductor 16 employed inside circuit package 12 is shown in section in FIG. 1B with an upper flat strip conductor 17 and a lower flat strip conductor 19 composed of a thin film conductive metal such as aluminum, silver, gold, platinum, etc. Conductor 19 is slightly wider. Both conductors have a thickness $t_1$ selected to provide a minimum anomalous skin effect resistance. Thickness $t_1$ applies for a single conductor or a pair of conductors between which energy can be transmitted. A dielectric 18 which can be $SiO_2$ is provided for separation of the two conductors 17 and 19.

FIG. 2A to 2G shows examples of several varieties of conductors adapted for operation under anomalous skin effect conditions with conductor thicknesses of $t_2$ or $t_1$ selected depending upon whether there is a set of conductors adjacent to a single conductor or a single conductor alone or adjacent to a conductor respectively. The space between conductors would include a dielectric omitted for convenience of illustration.

Figure 2A:
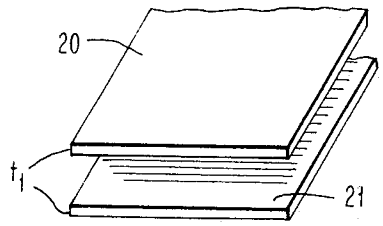
FIGS. 2A–2G show a plurality of conductors adapted for providing transmission of electromagnetic energy in accordance with this invention.

Referring to FIG. 2A a strip type of transmission line is shown with a pair of flat parallel strip conductors 20, 21 of equal width having a thickness $t_1$ since there is a single conductor 21 adjacent to conductor 20.

Figure 2B:
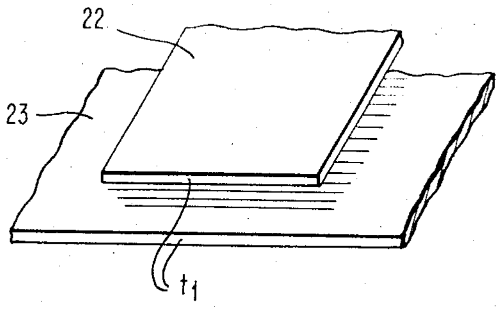

FIG. 2B shows a strip form of upper conductor 22 above a ground plane 23, each being of thickness $t_1$.

Figure 2C:
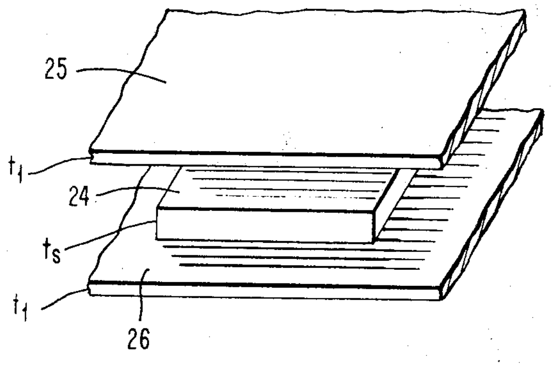

FIG. 2C shows a single strip transmission line 24 of thickness $t_s$ two ground planes 25, 26 of thickness $t_1$. Line 24 is between a set of two conductors 25, 26 so it should have thickness $t_s$ for low resistance and impedance in the anomalous skin effect region.

Figure 2D:
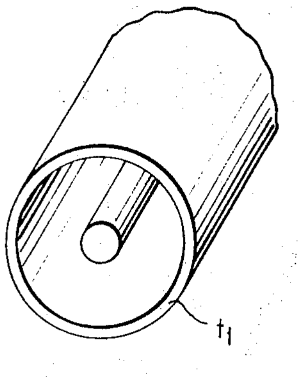

FIG. 2D shows a coaxial conductor with the outer conductor having the thickness $t_1$, provided that the thickness is much smaller than the diameter.

Figure 2F:
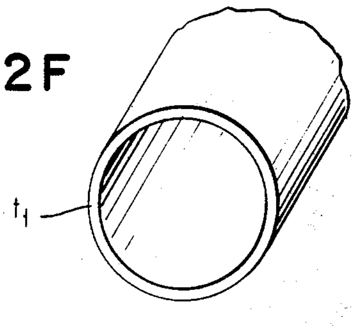
Figure 2G:
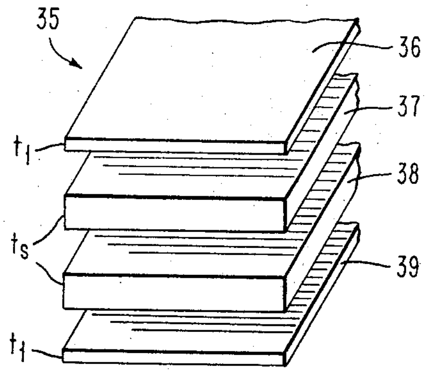
Figure 2E:
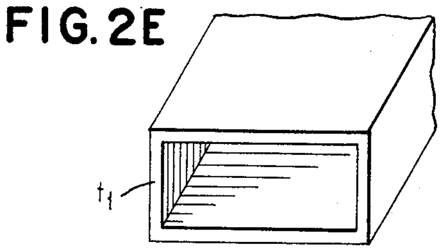

FIG. 2E shows a rectangular waveguide and FIG. 2F shows a circular waveguide with walls of thickness $t_1$.

FIG. 2G shows a quadruple parallel strip conductor arrangement 35 with upper and lower conductors 36, 39 of thickness $t_1$ and intermediate conductors 37, 38 of thickness $t_s$.

The general principles applicable in accordance with this invention are applicable to other configuration than those shown herein which are intended to be illustrative of the kinds of conductor arrangements which can be employed in accordance with this invention.

FIG. 3 shows a curve of the resistance of a conductor having a set of conductors adjacent thereto so that its anomalous skin effect thickness would ideally be $t_s$ and the resistance is $R_s$. The upper curve shows that for the classical skin effect, at room temperature, the resistance of an aluminum conductor remains the same as the thickness is reduced to just below $10^{-2}$ where it is slightly smaller and for reduction of thickness to $10^{-3}$ and smaller, the resistance increases rapidly as the thin film becomes thinner than that.

We have discovered a novel effect caused when operating in the anomalous skin effect region at a temperature near 4.2°K with $l = 0.01$cm. As can be seen, for a very rough conductor with $p = 0$, at $3.5 \times 10^{-4}$ cm thickness we have calculated the minimum resistance to be $5 \times 10^{-5}$ ohms/cm$^2$ vs. $13 \times 10^{-5}$ for thicker films. For moderately smooth thin films $p = 0.5$, the minimum value of $R_s$ is $3.5 \times 10^{-5}$. For $p = 1$, i.e., for perfectly smooth specular conductor surfaces, the absolute minimum value of $R_s$ is $6.5 \times 10^{-6}$ ohms for the frequency of $1.3 \times 10^8$ Hz with $l = 0.01$cm at 4.2°K. When compared with the thick film resistance of $130 \times 10^{-6}$ ohms at $10^{-4}$cm thickness there is a reduction of 21 times below that resistance to the resistance of $6.5 \times 10^{-6}$ ohms of that film in the anomalous skin effect region. The lowest classical skin effect resistance at room temperature is about $1{,}600 \times 10^{-6}$ ohms ($2.3 \times 10^{-2}$cm thickness). That shows that $6.5 \times 10^{-6}$ ohms is about a 246 times improvement from 1,600 down to 6.5. Heretofore, it had been considered that the anomalous skin effect curve would be similar to the classical skin effect curve and accordingly no substantial reduction in resistance would occur at which the horizontal essentially fixed thick film resistance no longer is sustained as the film thickness is reduced from 10cm in FIG. 3. The sharp dip shown for the idealized smoothness of $p = 1$, which can be approached as a limit in practice, provides a very significant reduction in the resistance of conductors. Accordingly, it promises significant improvement in design of large scale integrated circuits which can have very significant heat dissipation problems in terms of heat transfer, where efficiency of use of power becomes very significant. High frequency transmission of power is also far more efficient at such lower resistance values.

Figure 4:
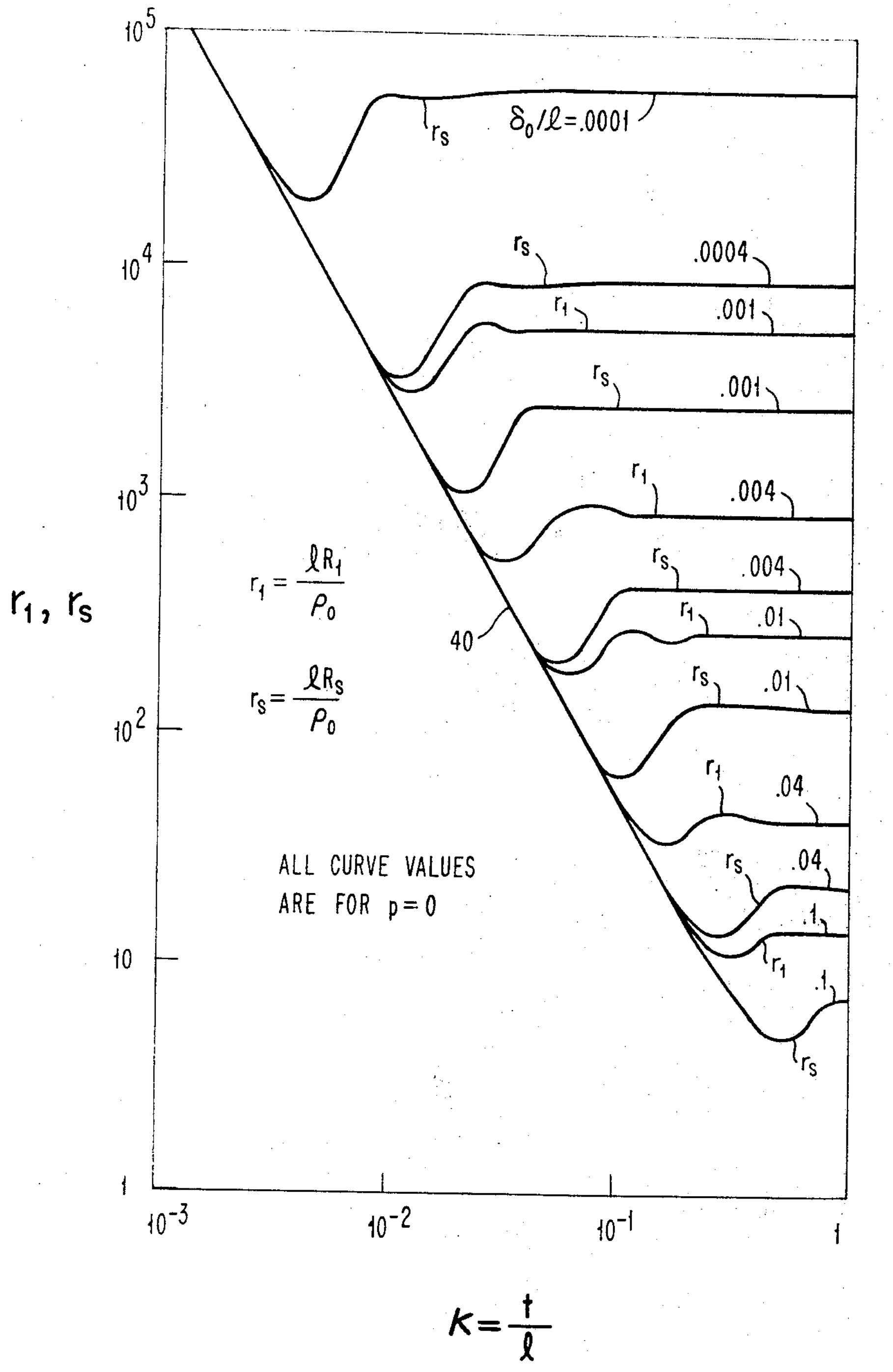
FIG. 4 is a plot of the factor $r_1$, $r_s$ versus K.

FIG. 4 shows relatively universal values with $p = 0$ for both horizontal and vertical axes which have been normalized in such a way as to be general for various materials. The vertical axis represents normalized resistance with the mean free path as a measure of dimensions, temperature, and thickness in the numerator and resistivity as a measure of material in the denominator so that the curve can be converted for any resistivity and any mean free path desired with $p = 0$. The horizontal axis is labelled $K = t/l$ so that thickness of the material has been normalized by the mean free path, to make the thickness values independent of temperature and purity. Resistance values $r_s$ for element 24 and $r_1$ for elements 25, 26 in FIG. 2C, etc., are shown for various values of $\delta o/l$ which represents the classical skin depth (inversely related to the square root of frequency) normalized by the mean free path. As frequency is increased, $\delta o/l$ changes from 0.1 to 0.0001 and the minima in values of $r_1$ and $r_s$ move to smaller values of normalized thickness K of about 4.5 for $r_s$ down to a K value of $3.5 \times 10^{-3}$ for $r_s$. It should also be noted, however, that the normalized resistance values for higher frequencies or lower values of $\delta o/l$ are higher as indicated by the slope of curve 40 from the upper left hand corner to the lower right hand corner of the graph.

Figure 5:
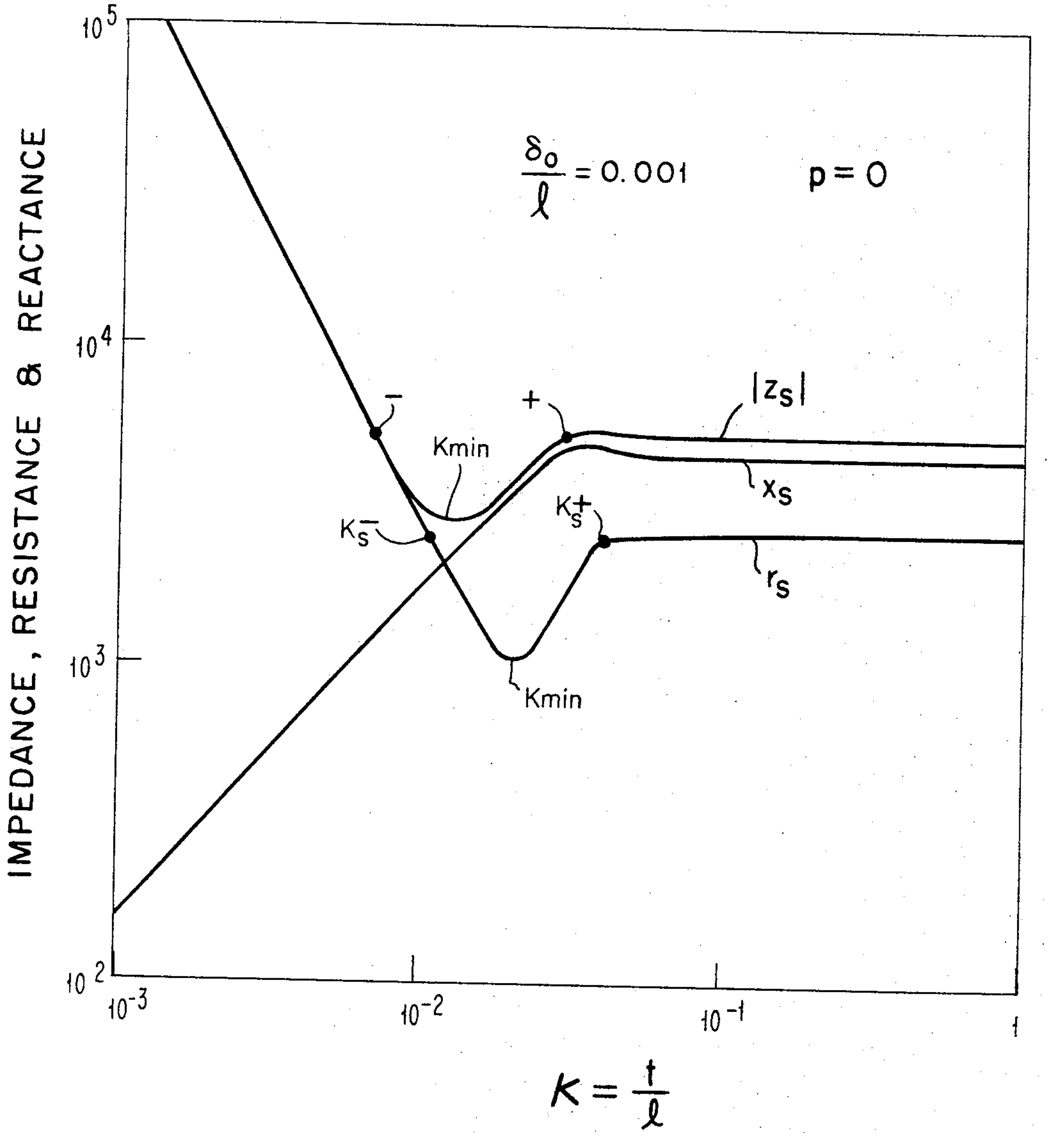
FIG. 5 is a plot of $r_s$, $x_s$ and $z_s$ versus K.

FIG. 5 is a curve of normalized values of resistance, reactance and impedance, i.e., multipled by $l/p$ for $\delta o/l = 0.001$. It will be seen that the minimum of resistance $r_s$ is at $K = 2 \times 10^{-2}$; whereas the minimum of $Z_s$ is at $K = 1.3 \times 10^{-2}$. This means that the optimum impedance will be provided for a slightly thinner film than required for optimum resistance which means that consideration of phase shift must be used in determining what is optimum, where appropriate. Note that reactance will decline sharply after + for $Z_s$ which is the larger thickness of $K = 3.5 \times 10^{-2}$ at which the resistance $Z_s$ begins to decline. Another point worthy of note is that the point marked plus (+) where K equals $4 \times 10^{-2}$ is a slightly larger value of K at which the curve of $r_s$ begins to decline. Values marked − are those values at which $Z_s$ and $r_s$ climb back to their values at plus (+), i.e., for $K = 7 \times 10^{-3}$ and $10^{-2}$ respectively.

Figure 6:
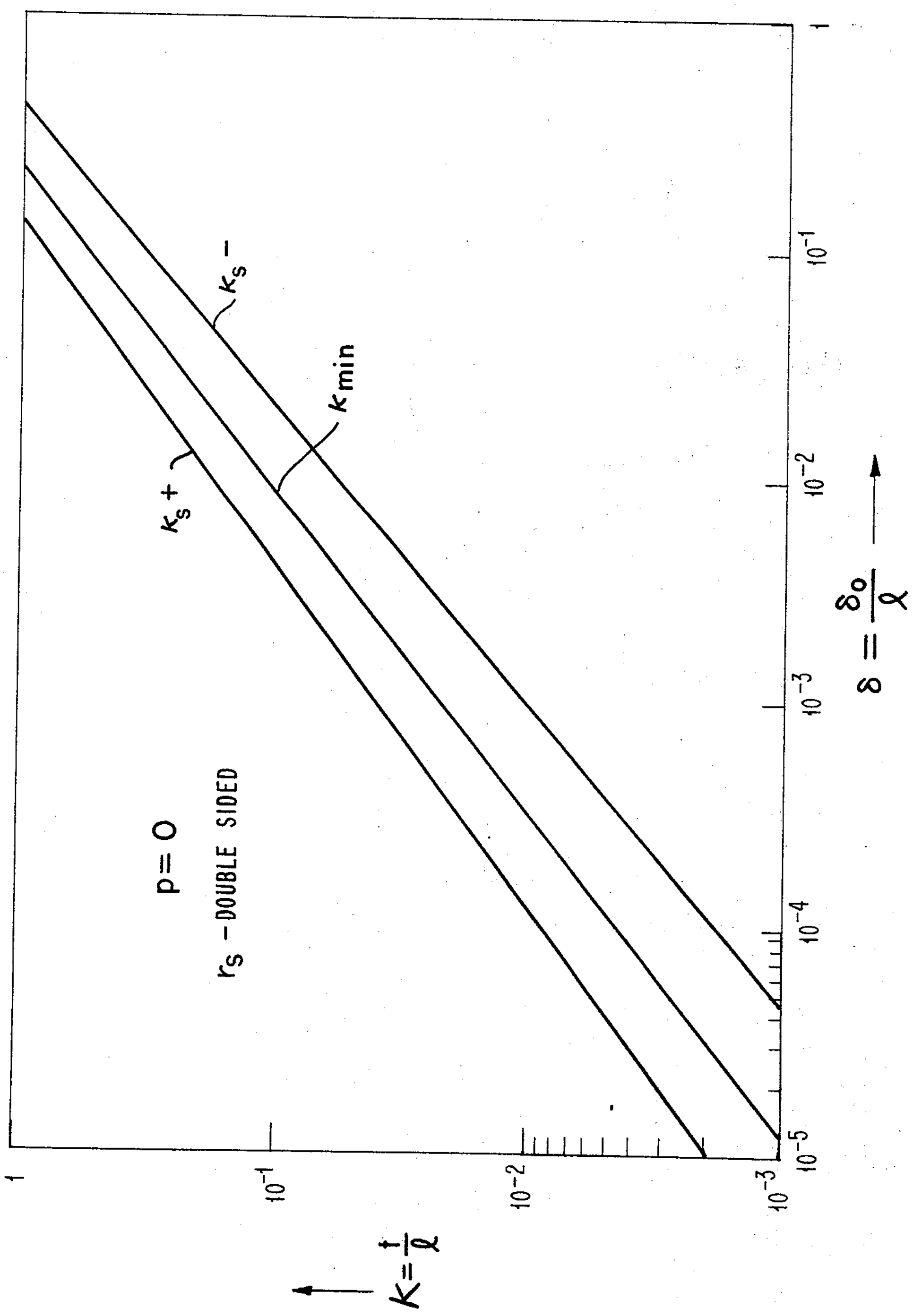
FIG. 6 is a plot of Kmin, $K^+$ and $K^-$ versus $\delta$ for $p = 0$.

FIG. 6 shows the values of K or normalized thickness versus normalized wavelength $\delta o/l$ with curves showing Kmin values at which the resistance is minimal for an extremely rough conductor $p = 0$.

Figure 7:
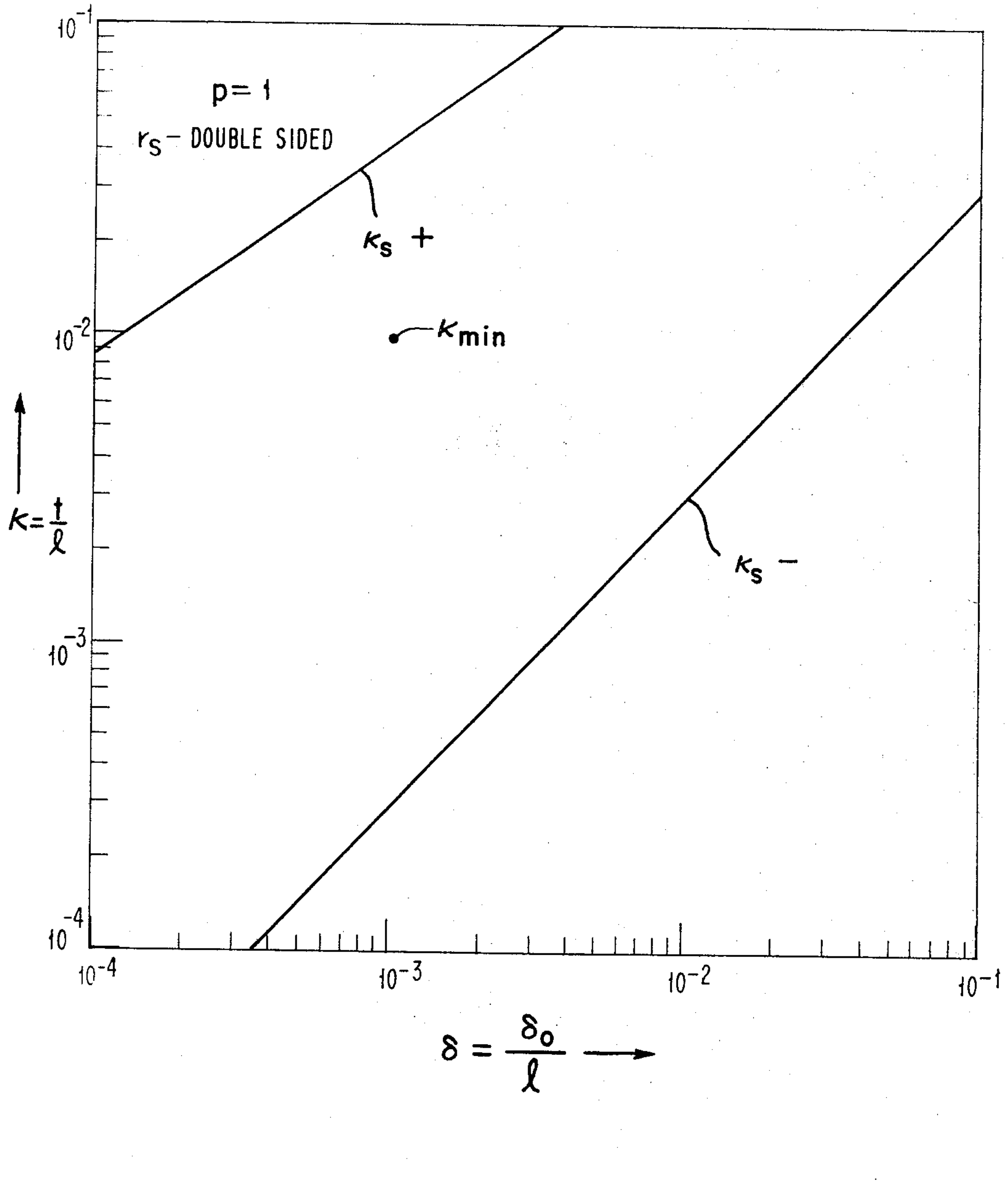
FIG. 7 is a plot similar to FIG. 6 for $p = 1$.

FIG. 7 shows the same curves for an extremely smooth conductor $p = 1$. Note the wide spread of $K_s{}^{+}l$ and $K_s{}^{-}l$ which can be best understood by reference to FIG. 3 in which for $p = 1$ the value of $K_s^{-}$ is shown to be at a thickness below $10^{-5}$cm, whereas $K_s^{-}$ for $p = 0$ is at about $10^{-4}$cm thickness, showing a far broader range of thickness for which resistance $R_s$ as well as $r_s$ is minimal with a smooth conductor for $p = 1$.

Figure 8:
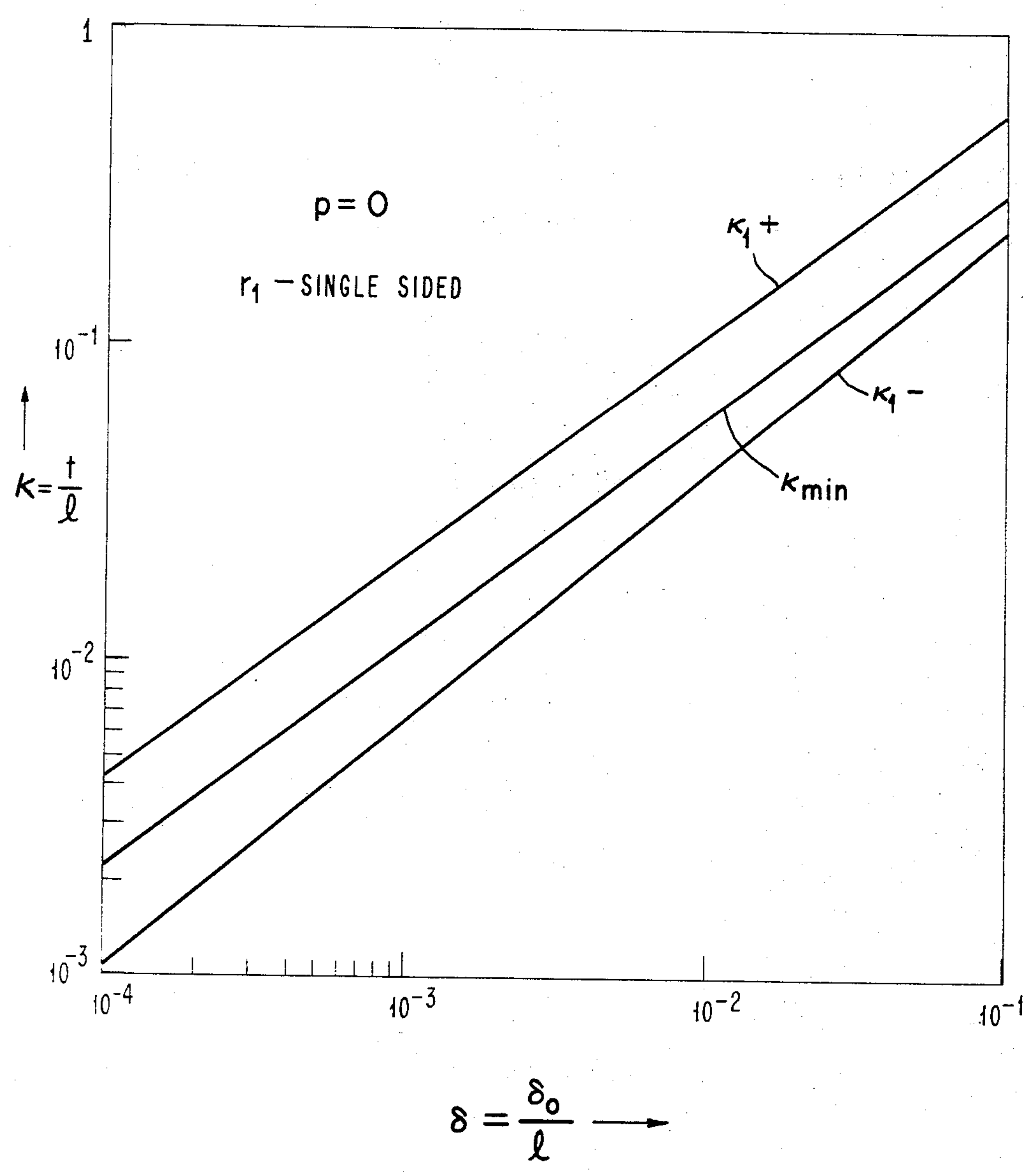
FIG. 8 is a plot for Kmin, $K^+$ and $K^-$ versus $\delta$ for $p = 0$ of a sheet conductor, to which an electric field is applied on one surface.
Figure 9:
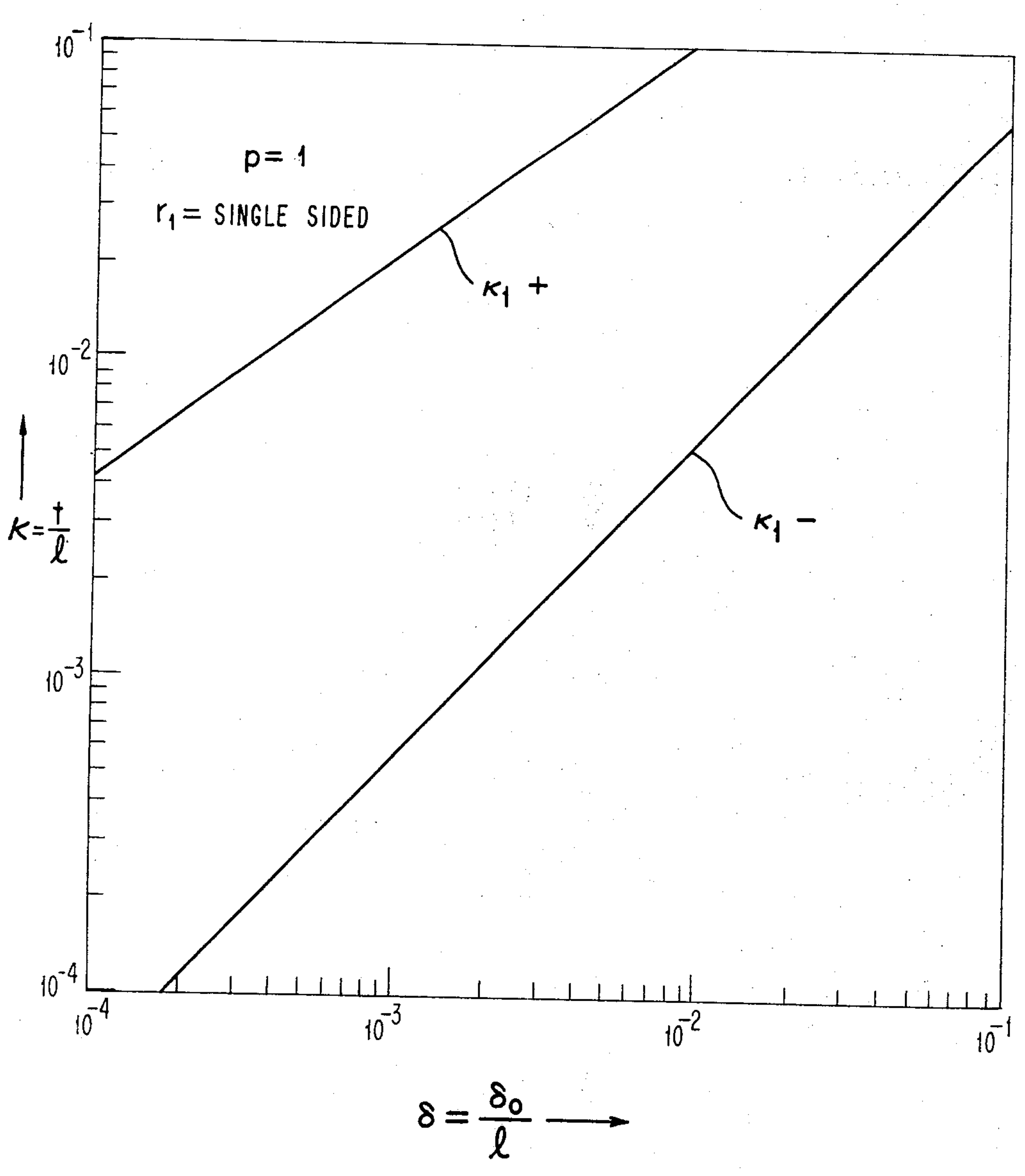
FIG. 9 is a plot of $K = t/l$ versus $\delta$ for $p = 1$ with $r_1$ single sides.

FIGS. 8 and 9 show similar plots to FIGS. 6 and 7 respectively for the single sided conductor of thickness $K = t/l$.

FIGS. 7 and 9 omit the curve for Kmin which has yet to be determined, but which is between K+ and K−, manifestly.

Method of Using Curves in Design of Conductors

This method will be described in connection with an exemplary conductor composed of aluminum at a frequency of $1.3 \times 10^{-8}$ hertz and a resistivity of $10^{-10}$ohm cm.

The first step is to calculate $\delta o$ based upon $\omega^{-1/2}$ and $\rho^{1/2}$ as set forth under equations above. In this case $\delta o$ is $10^{-5}$cm. ($\omega = 2\pi f$.)

The next step is to look up $\rho l$ for aluminum which is $5 \times 10^{-12}$ohm cm$^2$, using the above value of $\rho; l = 10^{-2}$cm.

Next find $\delta = \delta o/l$ which is $10^{-3}$. We chose a smoothness $p$ of zero.

Assuming a case as in FIG. 2C we refer to FIG. 6 which has values for $p = 0$. We find that Kmin $\approx 2 \times 10^{-2}$.

Since

Kmin $\cdot\, l$ = tmin; then tmin $= 2 \times 10^{-2} \times 10^{-2}$cm $= 2 \times 10^{-4}$cm.

FIG. 4 for $\delta = 0.001$ or $10^{-3}$, the minimum value of $r_s$ is about $10^3$ since $r_s = lR_s/\rho$ and therefore $R_s = r_s\rho/l$, then $R_s = (10^3 \,.\, 5 \times 10^{-10})/10^{-2} = 5 \times 10^{-5}$ ohms.

What is claimed is:

1. A conductor comprising means for transmission of electrical energy within a predetermined range of frequencies, said means for transmission being characterized by an anomalous skin effect region wherein the classical skin depth $\delta o$ in said means for transmission is smaller than the intrinsic mean free path of electrons in said means for transmission provided by the application of a selected maximum temperature T and corresponding minimum frequency, said means for transmission being of a thickness $t$ such that its impedance is less than the thick film impedance within said predetermined range of frequencies where the normalized thickness $K = t/l$ is between the $K^+$ line and the $K^-$ line for the normalized skin depth $\delta = \delta o/l$ and its associated range of frequencies where $K^+$ and $K^-$ respectively define the upper and lower limits of the range of normalized film thicknesses where the resistance is at most just below the thick film resistance in the anomalous skin effect region and where $l$ is the intrinsic mean free path of electrons, and means for cooling said conductor at least to said selected maximum temperature T.

2. Apparatus in accordance with claim 1 wherein said film is of thickness $z=t$ where the variable $z$ is related to impedance by the equation $$\left[ Z \equiv \frac{lE_1}{\rho_0 \int_{-t/2}^{t/2} J(z)\,dz} \right] Z \equiv \frac{lE(-t/2)}{\rho_0 \int_{-t/2}^{t/2} J(z)\,dz}$$

for values of the resistive component $r$ of Z versus K which are less than the thick film resistance where $E(-t/2)$ is the field of the surface where $z = -t/2$ and $J(z) = (1/\rho\, E(z)$ is the current density and where $E(z)$ is the electric field and $\rho$ is resistivity, and $-t/2$ and $t/2$ are surfaces of said film of thickness $t$.

3. A method of transmitting electrical energy comprising selecting a thin film conductor with a thickness $t$ for operation at frequency $f$, where the normalized thickness $K = t/l$ is between the $K^+$ line and the $K^-$ line for the normalized skin depth $\delta = \delta o/l$ and its associated range of frequencies where $K^+$ and $K^-$ respectively define the upper and lower limits of the range of normalized film thickness where the resistance is at most just below the thick film resistance in the anomalous skin effect region and where $l$ is the intrinsic free path of electrons, effecting cooling heat transfer in said conductor to bring said conductor to a temperature T and said temperature T and said frequency $f$ being such as to place said energy transfer in an anomalous skin effect region wherein the classical skin depth $\delta o$ in said conductor is smaller than the mean free path of electrons in said conductor, and applying electrical energy having a frequency component $f$ to said thin film conductor of thickness $t$ whereby the impedance of said conductor is smaller than for thick film conductors.

4. A method of transmitting electromagnetic energy with a conductor, in a predetermined range of frequencies comprising effecting cooling heat transfer in said conductor to place said conductor at a temperature within the anomalous skin effect region for said predetermined range of frequencies, applying electromagnetic energy to said conductors within said range of frequencies, said conductor being selected to have a thickness $t$ whereby the impedance of said conductor is smaller than for thick films within said range of frequencies where the normalized thickness $K = t/l$ is between the $K^+$ line and the $K^-$ line for the normalized skin depth $\delta = \delta o/l$ and its associated range of frequencies wherein $\delta o$ is the classical skin depth of said conductor and where $K^+$ and $K^-$ respectively define the upper and lower limits of the range of normalized film thicknesses where the resistance is at most just below the thick film resistance in the anomalous skin effect region and where $l$ is the intrinsic mean free path of electrons.

5. Apparatus comprising a source of electromagnetic energy, a structure including a conductor for transmitting said electromagnetic energy connected to said source, said conductor having a thickness $t$ where the normalized thickness $K = t/l$ is between the $K^+$ line and the $K^-$ line for the normalized skin depth $\delta = \delta o/l$ and its associated range of frequencies where $K^+$ and $K^-$ respectively define the upper and lower limits of the range of normalized film thickness where the resistance is at most just below the thick film resistance in the anomalous skin effect region and where $l$ is the intrinsic mean free path of electrons, wherein within a predetermined range of frequencies at a corresponding temperature for operation in the anomalous skin effect region said thickness $t$ has a value providing a smaller impedance than for a thick film conductor, and means for cooling said transmission line to a said corresponding temperature.

6. A conductor for carrying high frequency electromagnetic signals wherein the thickness of the conductor is substantially $t$ where the normalized thickness $K = t/l$ is between the $K^+$ line and the $k^-$ line for the normalized skin depth $\delta = \delta o/l$ and its associated range of frequencies where $K^+$ and $K^-$ respectively define the upper and lower limits of the range of normalized film thickness where the resistance is at most just below the thick film resistance in the anomalous skin effect region and where $l$ is the intrinsic mean free path of electrons, and where $t$ defines the film thickness which provides substantially the lowest high frequency resistance at a selected temperature and selected frequency in the anomalous skin effect region where the high frequency resistance, $R_{HF}$, is no longer proportional to the square root of the D.C. resistivity of the material, and means for cooling said conductor to a temperature in the anomalous skin effect region.

7. Apparatus in accordance with claim 6 wherein $t$ is within a range of thickness values which minimizes the flow of current in the reverse direction.

8. Apparatus in accordance with claim 6 wherein $t$ is substantially $2.4\ [\ (9/4\pi)\ \delta o^2 l]^{1/3}$ where $\delta o$ is classical skin depth and $l$ is the electron mean free path.

9. A conductor system comprising means for transmission of electrical energy at about $1.3\times10^8$ Hz at a temperature of about 4.2° K, said means for transmission being characterized by an anomalous skin effect region wherein the classical skin depth $\delta o$ of said means for transmission is smaller than the intrinsic mean free path of said means for transmission provided by the application of a selected maximum temperature T and corresponding minimum frequency, said means for transmission being composed of aluminum, said means for transmission being of a thickness $t$ such that its impedance is less than the thick film impedance within said predetermined range of frequencies where the thickness $t$ is between about $5\times10^{-6}$ cm and $7\times10^{-4}$ cm for a double sided means for transmission, and means for cooling said means for transmission at least to said selected maximum temperature T.

10. A conductor comprising means for double-sided transmission of electrical energy within a predetermined range of frequencies, said means for double-sided transmission being characterized by an anomalous skin effect region wherein the classical skin depth $\delta o$ in said means for double-sided transmission is smaller than the intrinsic mean free path of said means for double-sided transmission provided by the application of a selected maximum temperature T and corresponding minimum frequency, for $p$ near zero where $p$ is the fraction of electrons specularly reflected at the surface of the conductor, said means for double-sided transmission being of a thickness $t$ such that its impedance is less than the thick film impedance within said predetermined range of frequencies where the normalized thickness $K = t/l$ is between about $10^{-2}$ and $4\times10^{-2}$ for the normalized skin depth $\delta = \delta o/l = 0.001$ and its associated range of frequencies, and means for cooling said conductor at least to said selected maximum temperature T.

* * * * *